US012779657B2

(12) United States Patent
Ludwig et al.

(10) Patent No.: US 12,779,657 B2
(45) Date of Patent: Nov. 3, 2026

(54) HAND-HELD POWER TOOL

(71) Applicant: Hilti Aktiengesellschaft, Schaan (LI)

(72) Inventors: Wolfgang Ludwig, Zaisertshofen (DE); Michael Morgenstern, Landsberg / Lech (DE); Michael Kögel, Ingenried (DE)

(73) Assignee: Hilti Aktiengesellschaft, Schaan (LI)

(*) Notice: Subject to any disclaimer, the term of this patent is extended or adjusted under 35 U.S.C. 154(b) by 227 days.

(21) Appl. No.: 18/705,747

(22) PCT Filed: Nov. 9, 2022

(86) PCT No.: PCT/EP2022/081232
§ 371 (c)(1),
(2) Date: Apr. 29, 2024

(87) PCT Pub. No.: WO2023/094151
PCT Pub. Date: Jun. 1, 2023

(65) Prior Publication Data

US 2026/0124732 A1 May 7, 2026

(30) Foreign Application Priority Data

Nov. 23, 2021 (EP) .................................... 21210002

(51) Int. Cl.

| | |
|---|---|
| ***B25B 21/00*** | (2006.01) |
| ***B25B 21/02*** | (2006.01) |
| ***B25F 5/02*** | (2006.01) |

(52) U.S. Cl.
CPC ................ *B25F 5/02* (2013.01); *B25B 21/02* (2013.01)

(58) Field of Classification Search
CPC ....... B25B 21/02; B25B 21/00; B25B 21/002; B25B 13/488; B25B 23/1415;
(Continued)

(56) References Cited

U.S. PATENT DOCUMENTS 3,813,567 A * 5/1974 Schmuck ............... H02K 7/145 310/239
6,095,659 A 8/2000 Hsu et al.
(Continued)

FOREIGN PATENT DOCUMENTS

DE 19927487 A1 1/2000
DE 202012013579 U1 12/2017
(Continued)

OTHER PUBLICATIONS

International Search Report PCT/EP2022/081232 dated Mar. 4, 2023.

*Primary Examiner* — Jacob A Smith
(74) *Attorney, Agent, or Firm* — Davidson Kappel LLC

(57) ABSTRACT

A hand-held power tool (1) having a drive device (5) by which a tool that is able to be operatively connected to the power tool (1) is able to be actuated via a transmission device (7) having a transmission housing (9). A housing device (3) is provided, within which the drive device (5), having a rotor (31) and a stator (29), and the transmission device (7) are arranged. An electrically conductive connecting device (40) is provided within the power tool (1). The connecting device (40) electrically conductively connects the stator (29) of the drive device (5) to the transmission housing (9).

18 Claims, 3 Drawing Sheets

(58) Field of Classification Search
CPC ... B25B 21/026; B25B 23/1475; B25B 23/18; B25B 23/00; B25B 21/008
USPC ............................................ 173/93, 213, 90
See application file for complete search history.

(56) References Cited

U.S. PATENT DOCUMENTS

| | | | | |
|---|---|---|---|---|
| 6,213,224 | B1 * | 4/2001 | Furuta | B25F 5/001 173/217 |
| 2007/0001536 | A1 * | 1/2007 | Riedl | H02K 23/18 310/71 |
| 2011/0017473 | A1 * | 1/2011 | Clarkson | E21B 7/062 166/380 |
| 2013/0193891 | A1 | 8/2013 | Wood et al. | |
| 2019/0075639 | A1 * | 3/2019 | Brueck | H02K 9/06 |
| 2020/0177047 | A1 * | 6/2020 | Kutsuna | H02K 3/522 |
| 2021/0028671 | A1 | 1/2021 | Chung et al. | |
| 2021/0283762 | A1 | 9/2021 | Kusumoto et al. | |

FOREIGN PATENT DOCUMENTS

| | | | |
|---|---|---|---|
| EP | 1382421 | A2 | 1/2004 |
| EP | 2139095 | A2 | 12/2009 |
| JP | 2013000863 | A | 1/2013 |

* cited by examiner

HAND-HELD POWER TOOL

The invention relates to a hand-held power tool having a drive device by means of which a tool that is able to be operatively connected to the power tool is able to be actuated via a transmission device having a transmission housing.

BACKGROUND

US 2019/0075639 A1, for example, discloses an electric power tool, which has a housing and a motor, wherein the motor, having a rotor, is arranged and held in the housing and is driven by a power source.

SUMMARY OF THE INVENTION

During operation of the electric power tool, voltage differences can arise between different components of the electric power tool, and these can induce electric fields which in turn can disturb an electronic system or a control device. In order to reduce such voltage differences, a wire is provided in US 2019/0075639 A1, which is electrically connected between the rotor and a connector of the power source. By means of the wire, electrostatic charges that are induced for example by a fan can be dissipated and voltage differences reduced. Electrostatically charged plastics parts cause large voltage differences and possibly discharges, which can damage the electronic components.

In the solution of the 639 publication, a long distance within the electric power tool needs to be bridged by the wire, since the rotor and the voltage source are arranged in regions of the electric power tool that are far away from one another. It can be problematic to guide the wire on account of the available spatial conditions. In addition, the long wiring can possibly have an undesired influence on an air flow within the housing.

Therefore, it is an object of the present invention to create a hand-held power tool in which the risk of the occurrence of electric fields, which can cause disturbances in particular of an electronic system or a control device, is reduced in a structurally simple manner that is favourable in terms of installation space.

Therefore, a hand-held power tool having a drive device is provided, wherein, by means of the drive device, a tool that is able to be operatively connected to the power tool is able to be actuated via a transmission device having a transmission housing, wherein a housing device is provided, within which the drive device, having a rotor and a stator, and the transmission device are arranged, and wherein an electrically conductive connecting device is provided, in particular for reducing voltage differences, within the power tool. The invention proposes that the connecting device electrically conductively connects a stator of the drive device to the transmission housing.

A hand-held power tool embodied according to the invention, which may be embodied for example as a power screwdriver, as an impact screwdriver, as a chipping machine, as an angle grinder, as a sawing machine or the like, has the advantage that, in a cost-effective manner optimized in terms of installation space, voltage differences that arise during operation between different components are advantageously low as a result of the provision of the connecting device and thus the risk of an electronic system or control device being disturbed by electric fields is advantageously low. The stator of the drive device embodied as an electric motor is preferably arranged in the spatial vicinity of the in particular metallic transmission housing, such that the connecting device takes up only little installation space within the housing device of the hand-held power tool. The risk of an air flow provided for example for cooling being undesirably influenced by the connecting device is also low as a result.

Voltage differences between individual components of the hand-held power tool can arise in particular through components that conduct high voltage in operation or through a fan. During the operation of a hand-held power tool embodied according to the invention, advantageously no undesirably large electrostatic charges in particular in plastics parts arise, and so discharges that could result in damage to electronic component are reliably prevented.

The connecting device is conductive and embodied in particular with metal, for example steel, and cooperates with the stator and transmission housing, which are likewise embodied with a conductive material. In principle, the connecting device can also be embodied with other suitable conductive materials, however.

The connecting device is preferably not fixedly connected to the transmission housing and/or the stator. In this case, it is in particular advantageous when the connecting device is able to be operatively connected to, in particular brought releasably into engagement with a housing element of the housing device and is preferably held on the housing element. To cooperate with the connecting device, the housing element can have for example ribs or the like, such that the connecting device is easily held and/or positioned on the housing element and is also able to be assembled together with the housing element.

In one advantageous embodiment of the invention, the connecting device has a first connecting region for cooperating with the stator, wherein the first connecting region is embodied with at least one, in particular two resilient regions. The resilient regions are embodied in particular such that the resilient regions of the connecting device press against the stator with a desired force in the assembled state and as a result contact between the connecting device and the stator is ensured even without fixed attachment between the stator and the connecting device. In addition, in this way, tolerances and movements during operation of the power tool can easily be compensated and contact between the stator and the connecting device reliably maintained.

In one advantageous embodiment of the invention, the connecting device has a second connecting region for cooperating with the transmission housing, wherein the second connecting region is embodied with at least one, in particular two resilient regions. The resilient regions are embodied in particular such that the resilient regions of the connecting device press against the transmission housing with a desired force in the assembled state and as a result contact between the connecting device and the transmission housing is ensured even without fixed attachment between the transmission housing and the connecting device. In addition, in this way, tolerances and movements during operation of the power tool can easily be compensated and contact between the transmission housing and the connecting device reliably maintained.

In one preferred development of the invention, the resilient regions of the second connecting region of the connecting device are positioned so as to be angled outwards in a radial direction in a region facing forwards in the longitudinal direction of the power tool in the assembled state of the power tool. As a result, in correspondingly embodied power tools, the transmission can be moved forwardly in the longitudinal direction without releasing the connecting device from the transmission housing and can be operatively connected easily to the connecting device again, wherein tilting of the connecting device is reliably prevented by the provision of the regions of the connection device that are bent for example outwardly in a radial direction.

In the assembled state of the power tool, the connecting device cooperates loosely with the stator and/or the transmission housing preferably via the first connecting region and/or the second connecting region. As a result, easy assembly of the connecting device with the housing element and also easy replacement of the electric motor or transmission device are possible without a connection between the connecting device and the stator and/or the transmission housing, for example in the form of a screw, needing to be released beforehand.

In one advantageous embodiment of the invention, the connecting device has, between the first connecting region and the second connecting region, a supporting region which is supported on an element of the power tool, for example a bearing block provided for mounting the electric motor, in the assembled state of the power tool. The supporting region can in turn cooperate, in the assembled state of the power tool, under spring preloading with the element of the power tool. By way of the supporting region, a position of the connecting device can easily be ensured when for example the transmission device is changed and the second connecting region temporarily does not cooperate with the transmission housing. The connecting device remains substantially in its position with the transmission device assembled.

In order for it to be possible to position the connecting device as desired with respect to the housing element of the housing device, the housing element has, in one advantageous embodiment of the invention, at least one contact region for positioning the connecting device. To this end, the housing device can have for example at least one centring element and at least one rib or the like, which cooperate in particular with the resilient regions of the connecting device.

Provision can be made that the connecting device is embodied with an electrically conductive cable which is connected to the stator at one end and to the transmission housing at the other end.

In a further embodiment of a hand-held power tool according to the invention, the connecting device is formed by an electrically conductive coating, in particular by an electrolytic coating of an inner wall of the housing element, wherein the housing element with the coating region is connected both to the stator and to the transmission housing. With such an embodiment, a separate component is not necessary and an implementation that is particularly favourable in terms of installation space is created.

If the housing device has two lateral housing shells and a front housing element connected releasably to the housing shells, given a corresponding construction of the hand-held power tool, the transmission is replaceable in particular easily, after the front housing element has been released, if there is no fixed connection between the connecting device and the transmission. The lateral housing shells can in this case remain in the connected-together state.

BRIEF DESCRIPTION OF THE DRAWINGS

Further advantages will become apparent from the following description of the figures. An exemplary embodiment of the present invention is depicted in the figures. The figures, the description and the claims contain numerous features in combination. A person skilled in the art will expediently also consider the features individually and combine them to form useful further combinations.

In the drawing.

DETAILED DESCRIPTION

Figure 1:
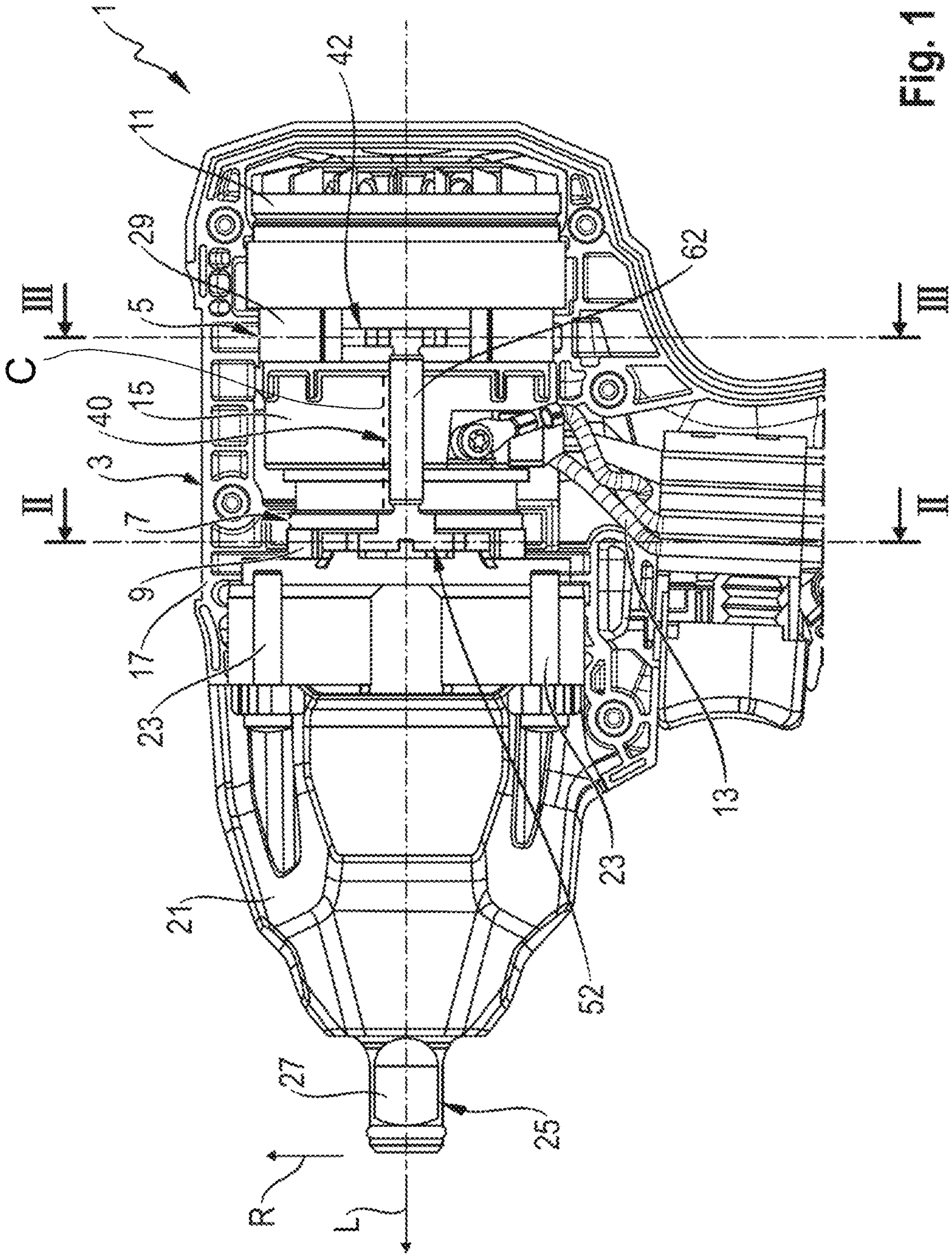
FIG. 1 shows a detail illustration of a hand-held power tool embodied as an impact screwdriver, having a connecting device, wherein a housing shell of a housing device is not illustrated.
Figure 2:
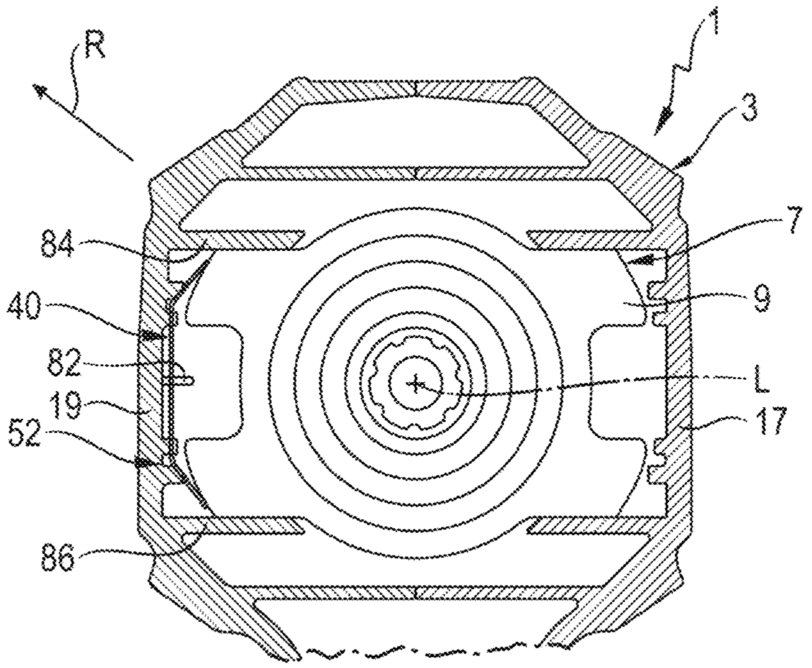
FIG. 2 shows a cross-sectional illustration of the impact screwdriver according to FIG. 1 along the line 2-2 according to FIG. 1.
Figure 3:
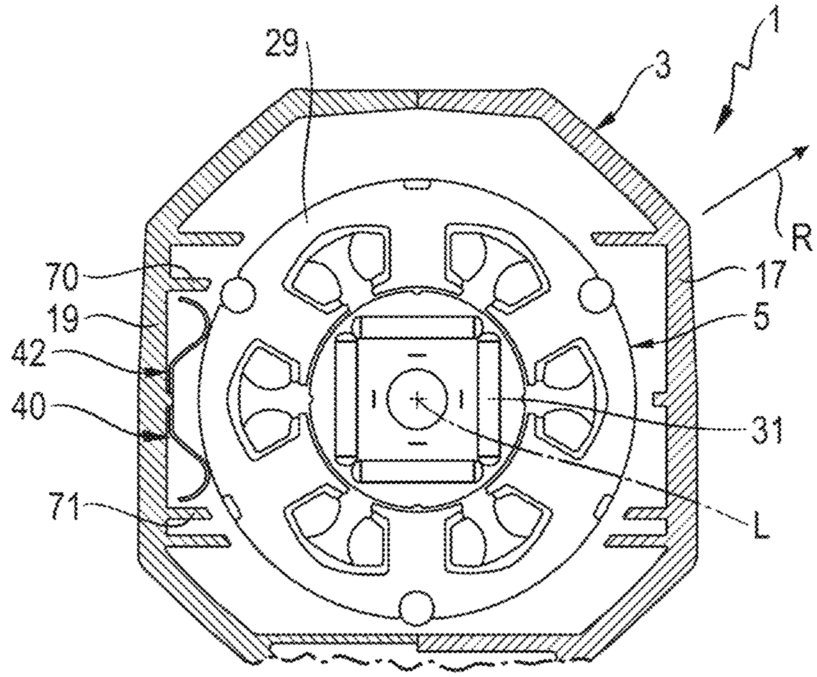
FIG. 3 shows a cross-sectional illustration of the impact screwdriver according to FIG. 1 along the line 3-3 according to FIG. 1.
Figure 4:
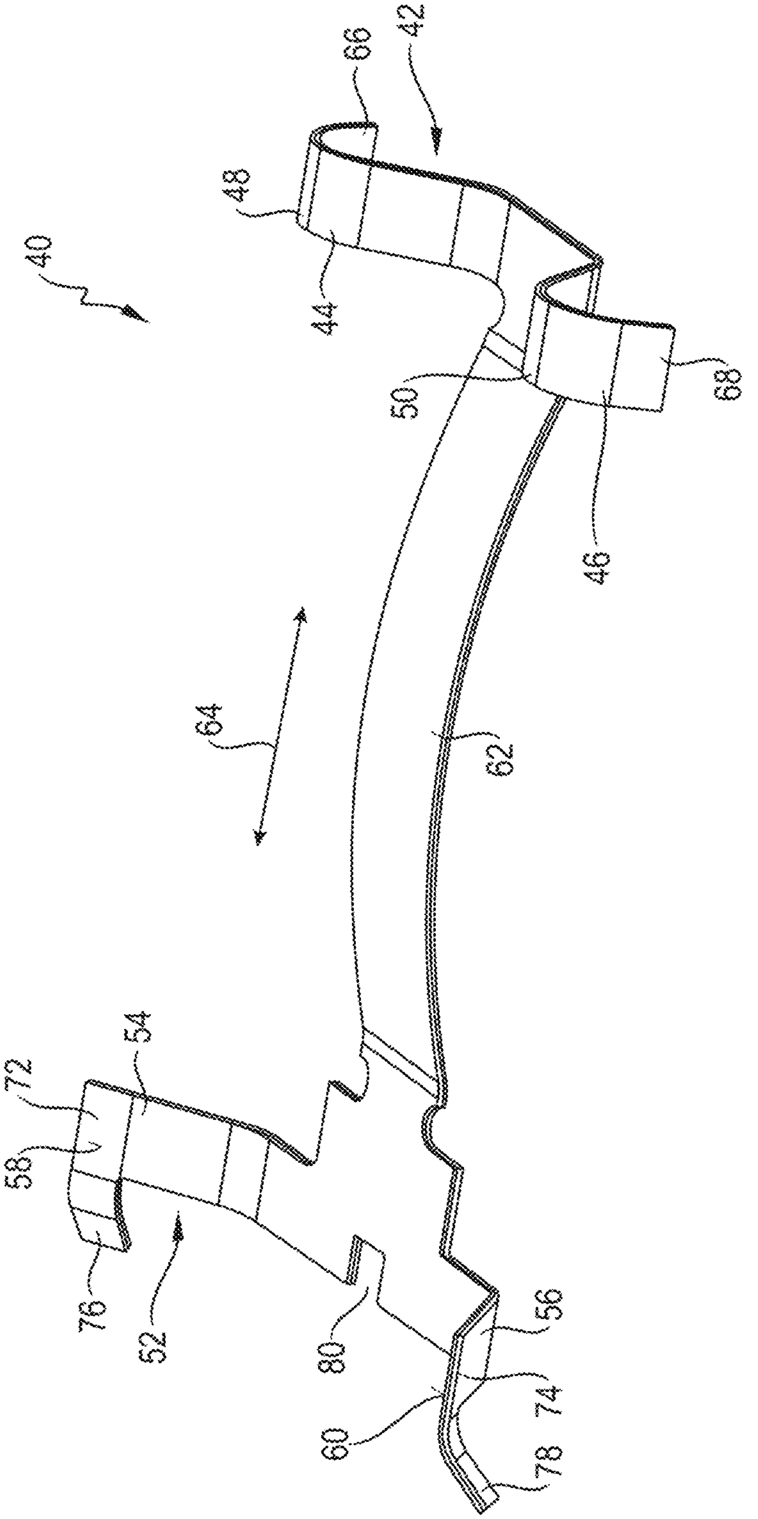
FIG. 4 shows a three-dimensional view of the connecting device according to FIG. 1 to FIG. 3 on its own.

FIG. 1 to FIG. 3 show a hand-held power tool 1, which is embodied as an impact screwdriver in the illustration shown. According to an alternative configuration, the hand-held power tool 1 can also be in the form of a drill, a hammer drill, a sawing machine, a chipping hammer or the like.

The hand-held power tool 1 has a housing device 3, in which a drive device embodied as an electric motor 5 and a transmission device 7 having a transmission housing 9 are arranged. Also visible in FIG. 1 is a fan 11, which is provided to cool the electric motor 5. Also shown is wiring 13, by means of which the electric motor 5 is coupled to a control device or electronic system of the hand-held power tool 1 and is controllable thereby.

The hand-held power tool 1 can be embodied both with a rechargeable battery as energy store or as a wired power tool 1 with a plug for coupling to a power grid.

FIG. 1 also shows a bearing device or a bearing block 15, in which the electric motor 5 is arranged and mounted at least regionally in a longitudinal direction L of the hand-held power tool 1. The bearing block 15 is in turn mounted on the housing device 3.

The housing device 3 is embodied in three parts here and has two housing shells 17, 19, which are embodied to receive and mount the electric motor 5, the fan 11, the transmission device 7 and the control device. The housing shells 17, 19 are embodied in particular as half-shells, wherein these are connectable together in a longitudinal centre plane that lies in the plane of the drawing. Only the housing shell 17 is visible in FIG. 1 and the housing shell 19 is not shown for the sake of clarity.

From the front in the longitudinal direction L, a front housing element 21 is arranged releasably on the housing shells 17, 19 in this case by means of screw connections 23, wherein for example an impact mechanism, for example a tangential impact mechanism having an anvil 25, is arranged within the front housing element 21.

By means of the electric motor 5, a torque is transmissible via the transmission device 7 and the impact mechanism to the anvil 25, to which a tool is able to be coupled in a known way in the region of a fitting 27, which is embodied here with a square shape.

The electric motor 5 is embodied in a known way with a stator 29 and a rotor 31 (see, e.g. FIG. 3), shown in more detail in the sectional illustration according to FIG. 3. The fan 11 is arranged on a side of the electric motor 5 remote from the transmission device 7 in the longitudinal direction L, in which an axis of rotation of the anvil 25 extends.

In FIG. 1 to FIG. 4, an electrically conductive connecting device 40 is visible, which is embodied here as a sheet-metal part, in particular a sheet-steel part. An alternate coating connecting device is shown solely schematically as C.

In the present case, the connecting device 40 has, in a first connecting region 42 at the rear in the longitudinal direction L, two resilient elements 44, 46 (see e.g. FIG. 4), which are embodied to cooperate with the stator 29 and, in the assembled state of the hand-held power tool 1, bear loosely on the stator with a respective contact region 48, 50.

In the present case, the connecting device 40 likewise has, in a second connecting region 52 at the front in the longitudinal direction L, two resilient elements 54, 56, which are embodied to cooperate with the transmission housing 9 and, in the assembled state of the hand-held power tool 1, bear loosely on the transmission housing with a respective contact region 58, 60.

The first connecting region 42 and the second connection region 52 are connected together via a supporting region 62 that extends substantially in the longitudinal direction 64 of the connecting device 40. In the assembled state of the connecting device 40, the longitudinal direction 64 of the connecting device 40 extends substantially parallel to the longitudinal direction L of the hand-held power tool 1.

Starting from the supporting region 62, the resilient elements 44, 46, 54, 56 each extend substantially transversely to the longitudinal direction 64 of the connecting device 40, wherein the connecting device 40 is embodied here overall in an H-shaped manner and substantially mirror-symmetrically to the longitudinal direction 64.

The resilient elements 44, 46, or the resilient regions of the first connecting region 42, each have an approximately U-shaped cross section, wherein, as is more clearly apparent from FIG. 3, an end region 66, 68 remote from the supporting region 62 is embodied in each case to cooperate with the housing shell 19. To this end, the housing shell 19 has respective ribs 70, 71 in order achieve positioning and centring of the connecting device 40 in this region. The contact regions 48, 50 of the resilient elements 44, 46 are each arranged in a region of the resilient elements 42, 44 that faces inwards in a radial direction R in the assembled state.

The resilient elements 54, 56, or the resilient regions of the second connecting region 52, have an L-shaped cross section, wherein the contact regions 58 and 60 are each arranged in an end region 54 and 56, respectively, that is remote from the supporting region 62 and directed or bent inwards in a radial direction R in the assembled state. In the present case, the end regions 54 and 56 each have an L-shaped extension 76 and 78, respectively, that faces forwards in the longitudinal direction 64, wherein the extensions 76, 78, starting from the respective end region 72 and 74, respectively, are directed or bent outwards in a radial direction R in the assembled state.

In an end region that faces forwards in the longitudinal direction 64, the supporting region 62 has, in the present case, a recess 80, which is intended to cooperate with a pin-like element 82 of the housing shell 19 according to FIG. 2. Furthermore, in the present case, in the assembled state, the connecting device 40 cooperates in each case, in the second connecting region 52, with a rib 84 and 86, respectively, of the housing shell 19 via the extensions 76 and 78, wherein, via the pin-like element 82 and the ribs 84 and 86, positioning, or centring and holding, of the connecting device 40 on or with respect to the housing shell 19 is achieved.

In the present case, the supporting region 62 is embodied with a slight bend, which is directed inwards in a radial direction R in the assembled state and is embodied to cooperate with or support the connecting device 40 in the present case with the bearing block 15.

In the present case, for assembly, the connecting device 40 is able to be operatively connected to the housing shell 19 and is held in particular thereon such that easy assembly of the connecting device 40 is achieved. In the assembled state of the hand-held power tool 1, the contact regions 48, 50, 58 and 60 bear, in particular applying force, on the stator 29 and the transmission housing 9, respectively, such that, as a result, tolerance compensation and movement of elements of the hand-held power tool 1 with respect to one another during operation is compensated easily and contact is easily ensured.

By way of the connecting device 40, replacement of the transmission device 7 with the housing shells 17, 19 assembled is easily allowed, since the connecting device 40 is held reliably in its position by cooperation of the supporting region 62 with the bearing block 15 and the resilient elements 44 and 46 with the stator 29 even without cooperation of the resilient elements 54 and 56 with the transmission housing 9. The extensions 76 and 78 furthermore represent a sliding face for the assembly of the transmission device 7, such that wedging or jamming of the transmission device 7 with respect to the connecting device 40 is reliably prevented.

By means of the connecting device 40, voltage differences that arise during operation of the hand-held power tool 1, in particular in the region of the electric motor 5 and of the transmission device 7, are able to be compensated easily, such that the risk of impairment of the control device or electronic system by electric fields induced thereby is reduced easily and no complicated measures, or at least reduced measures, for shielding the control device or the electronic system are required. Voltage differences can be induced for example during high-voltage operation of the hand-held power tool 1. The fan 11 can also induce voltage differences.

What is claimed is:

1. A hand-held power tool operatively connectable to a tool, the hand-held power tool comprising:

a drive having a rotor and a stator, the drive operatively connectable to the tool and actuatable via a transmission having a transmission housing;

a housing, the drive and the transmission being arranged in the housing; and an electrically conductive connector electrically conductively connecting the stator of the drive to the transmission housing.

2. The hand-held power tool as recited in claim 1 wherein the connector is operatively connectable to a housing element of the housing.

3. The hand-held power tool as recited in claim 1 wherein the connector has a first connecting region for cooperating with the stator, wherein the first connecting region is embodied with at least one resilient region.

4. The hand-held power tool as recited in claim 3 wherein the at least one resilient region includes two resilient regions.

5. The hand-held power tool as recited in claim 1 wherein the connector has a second connecting region for cooperating with the transmission housing, wherein the second connecting region is embodied with at least one resilient region.

6. The hand-held power tool as recited in claim 5 wherein the at least one resilient region includes two resilient regions.

7. The hand-held power tool as recited in claim 5 wherein the second connecting region is positioned so as to be angled outwards in a radial direction in a region facing forwards in a longitudinal direction of the power tool in an assembled state of the power tool.

8. The hand-held power tool as recited in claim 1 wherein the connector has resilient regions and cooperates with the stator and the transmission housing, respectively, via the resilient regions in an assembled state of the power tool.

9. The hand-held power tool as recited in claim 1 wherein the connector has, between a first connecting region for cooperating with the stator and a second connecting region for cooperating with the transmission housing, a supporting region supported on an element of the power tool in an assembled state of the power tool.

10. The hand-held power tool as recited in claim 2 wherein the housing element of the housing has at least one contact region for positioning the connector.

11. The hand-held power tool as recited in claim 1 wherein the connector is embodied with an electrically conductive cable connected to the stator at one end and to the transmission housing at the other end.

12. The hand-held power tool as recited in claim 1 wherein the housing has two lateral housing shells and a front housing element connected releasably to the housing shells.

13. The hand-held power tool as recited in claim 1 wherein the connector is not a screw.

14. The hand-held power tool as recited in claim 1 wherein the connector directly contacts the stator.

15. The hand-held power tool as recited in claim 1 wherein the connector directly contacts the stator at two points.

16. The hand-held power tool as recited in claim 1 wherein the connector is a sheet metal part.

17. A hand-held power tool operatively connectable to a tool. the hand-held power tool comprising:

a drive having a rotor and a stator, the drive operatively connectable to the tool and actuatable via a transmission having a transmission housing;

a housing, the drive and the transmission being arranged in the housing; and an electrically conductive coating electrically conductively connecting the stator of the drive to the transmission housing.

18. The hand-held power tool as recited in claim 17 wherein the coating is an electrolytic coating of an inner wall of the housing connected both to the stator and to the transmission housing.

* * * * *